[12] United States Patent
Schneider et al.

(10) Patent No.: US 11,345,367 B2
(45) Date of Patent: May 31, 2022

(54) METHOD AND DEVICE FOR GENERATING CONTROL SIGNALS TO ASSIST OCCUPANTS IN A VEHICLE

(71) Applicant: Volkswagen Aktiengesellschaft, Wolfsburg (DE)

(72) Inventors: Jens Schneider, Braunschweig (DE); Peter Schlicht, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 150 days.

(21) Appl. No.: 16/724,568

(22) Filed: Dec. 23, 2019

(65) Prior Publication Data

US 2020/0207370 A1    Jul. 2, 2020

(30) Foreign Application Priority Data

Dec. 28, 2018  (DE) ..................... 10 2018 133 672.1

(51) Int. Cl.
*B60W 60/00* (2020.01)
*B60W 40/08* (2012.01)
(Continued)

(52) U.S. Cl.
CPC ........ *B60W 60/0013* (2020.02); *B60W 40/08* (2013.01); *B60W 50/14* (2013.01);
(Continued)

(58) Field of Classification Search
CPC .. B60W 40/08; B60W 50/038; B60W 30/182; B60W 50/14; B60W 60/0013;
(Continued)

(56) References Cited

U.S. PATENT DOCUMENTS 8,108,136 B2   1/2012  Filev et al. ................... 701/123
9,517,771 B2  12/2016  Attard et al.
(Continued)

FOREIGN PATENT DOCUMENTS

CN   103359112 A  * 10/2013  ................ B60T 7/22
CN   102233877 B  *  5/2015  .......... B60W 50/038
(Continued)

OTHER PUBLICATIONS

Human Factors Evaluation of Level 2 and Level 3 Automated Driving Concepts; Published Date: Jul. 1, 2014.*
(Continued)

*Primary Examiner* — Yuri Kan, P.E.
(74) *Attorney, Agent, or Firm* — Slayden Grubert Beard PLLC

(57) ABSTRACT

The present disclosure relates to a method for generating control signals to assist occupants in a vehicle, wherein a context of the vehicle is determined, a rule of a rule-based data system is selected depending on the determined context, wherein the rule-based data system comprises a plurality of rules, wherein each rule has a condition part and a result part, wherein the condition part comprises conditions for the context of the vehicle, a confidence value associated with the selected rule is determined, wherein the confidence value indicates the probability with which the result of the rule corresponds with the preference of the user, a result of the selected rule is generated, a control signal is generated and output depending on the generated rule result, wherein the control signal automates a vehicle function with a degree of automation, wherein the degree of automation depends on the confidence value of the selected rule. The disclosure likewise relates to a device for executing this method.

20 Claims, 2 Drawing Sheets

(51) Int. Cl.
*B60W 50/14* (2020.01)
*G06K 9/62* (2022.01)
*G06N 5/04* (2006.01)

(52) U.S. Cl.
CPC .............. *G06K 9/626* (2013.01); *G06N 5/046* (2013.01); *B60W 2400/00* (2013.01); *B60W 2540/043* (2020.02)

(58) Field of Classification Search
CPC ............ G01C 21/3461; G01C 21/3446; G01C 21/3484; B60T 7/22; G05D 1/0274; G05D 1/0257; G05D 1/0061; B60K 28/10; B60R 16/02; G05B 23/0243; G06K 9/626
See application file for complete search history.

(56) References Cited

U.S. PATENT DOCUMENTS

| | | | |
|---|---|---|---|
| 9,630,618 B2 * | 4/2017 | Eigel .................. | B60W 50/14 |
| 9,989,963 B2 | 6/2018 | Perkins et al. | |
| 10,365,653 B2 | 7/2019 | Haghighat et al. | |
| 10,444,745 B2 * | 10/2019 | Juhasz ................ | G05B 23/0243 |
| 2014/0188388 A1 * | 7/2014 | Malahy .............. | G01C 21/3446 |
| | | | 701/533 |
| 2015/0294223 A1 | 10/2015 | Brown ............... | 706/46 |
| 2016/0334797 A1 * | 11/2016 | Ross .................. | G01C 21/3484 |
| 2017/0190337 A1 | 7/2017 | Singh et al. | |
| 2018/0292822 A1 * | 10/2018 | Ichikawa ............ | G05D 1/0257 |
| 2018/0326994 A1 * | 11/2018 | Sakai ................. | B60W 40/08 |
| 2018/0348740 A1 | 12/2018 | Rocci et al. | |
| 2019/0111933 A1 | 4/2019 | Schoeggl et al. | |
| 2019/0126913 A1 | 5/2019 | Kinuhata et al. | |
| 2019/0137290 A1 * | 5/2019 | Levy .................. | G01C 21/3461 |
| 2019/0382030 A1 | 12/2019 | Hotson et al. | |

FOREIGN PATENT DOCUMENTS

| | | | | |
|---|---|---|---|---|
| CN | 105936294 A | * | 9/2016 | ........... G05D 1/0274 |
| CN | 106274483 A | * | 1/2017 | ............. B60K 28/10 |
| CN | 108883774 A | * | 11/2018 | ............. B60R 16/02 |
| DE | 102007025352 A1 | | 12/2008 | ............. B60K 35/00 |
| DE | 102008031826 A1 | | 2/2009 | ............. B60K 23/00 |
| DE | 102010002300 A1 | | 8/2011 | ............. G01C 23/00 |
| DE | 102013212359 A1 | | 12/2014 | ............. B60W 30/08 |
| DE | 102014223242 A1 | | 5/2015 | ............. B60W 40/08 |
| DE | 102014013960 A1 | | 3/2016 | ............. B60K 31/00 |
| DE | 102015205133 A1 | | 9/2016 | ............. B60W 40/04 |
| DE | 102015206822 A1 | | 10/2016 | ............. B60W 30/06 |
| DE | 102015007242 A1 | | 12/2016 | ............. B60R 16/02 |
| DE | 102015215400 A1 | | 2/2017 | ............. G08G 1/0968 |
| DE | 102017103971 A1 | | 8/2017 | ............. B60W 50/00 |
| DE | 102016205153 A1 | | 10/2017 | ............. B60W 40/09 |
| DE | 102017002689 A1 | | 10/2017 | ............. G06F 15/18 |
| DE | 102016214916 A1 | | 2/2018 | ............. B60K 35/00 |
| DE | 102016215528 A1 | | 2/2018 | ............. B60R 16/02 |
| DE | 102016222499 A1 | | 5/2018 | ............. B60W 40/09 |
| DE | 102017200436 A1 | | 7/2018 | ............. B60W 50/08 |
| DE | 102017208159 A1 | | 11/2018 | ............. B60W 30/08 |
| DE | 102018113074 A1 | | 12/2018 | ............... B60H 1/00 |
| DE | 102018113782 A1 | | 12/2018 | ............. B60W 40/08 |
| DE | 112016006670 T5 | | 12/2018 | ............. B60R 16/037 |
| DE | 112017006530 T5 | | 9/2019 | ............. B60W 30/02 |
| JP | 6387157 B1 | * | 9/2018 | ........... B60W 30/182 |
| WO | 2017/067853 A1 | | 4/2017 | ............. B60W 50/14 |

OTHER PUBLICATIONS

Human Factors Evaluation of Level 2 and Level 3 Automated Driving Concepts ; Published Date: Jul. 1, 2014 (Year: 2014).*

* cited by examiner

METHOD AND DEVICE FOR GENERATING CONTROL SIGNALS TO ASSIST OCCUPANTS IN A VEHICLE

CROSS-REFERENCE TO RELATED APPLICATIONS

This application claims priority to German Patent Application No. DE 10 2018 133 672.1, filed on Dec. 28, 2018 with the German Patent and Trademark Office. The contents of the aforesaid Patent Application are incorporated herein for all purposes.

TECHNICAL FIELD

The present invention relates to a method and device for generating control signals to assist occupants in a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In order to assist occupants in a vehicle, in particular the driver of the vehicle, various assistance systems are known. Depending on the context of the vehicle, for example information is provided to the driver that makes it easier for him to accomplish the task of driving. Such assistance systems include for example, navigation systems, lane guidance systems such as an automated distance control, or a lane change assistance system. Moreover, systems are known that partially or completely independently take over the task of driving.

Such systems are for example designed to be adaptive. In particular, they can learn from previous situations. Currently, in particular adaptive systems are used that either rigidly consist of fixed expert rules, or are based on the techniques of artificial intelligence or machine learning. In the first case, fixed behavior patterns are defined in the system design and are described with rules. In this case, the system is not adaptive in the actual sense. It can however be adapted by changes of settings. Such systems are for example used in the field of infotainment and in the automobile's surroundings in the field of driver assistance. In the second case, data models are trained using comprehensive historical data. The adaptation of the system is derived based on these models.

A system is for example known from US 2015/0294223 A1 in which predictive algorithms are used in order to create contextual information for an event. The event record is transmitted to a cloud memory system. Inferences are derived from saved event records in this system. These inferences are then provided to other mobile terminals.

An assistance system for a vehicle user is known from WO 2017/067853 A1 in which the user is given recommendations on the use of the vehicle. Through a self-learning system, patterns can be recognized, and recommendations can be output based on these patterns.

A driver information system for a motor vehicle is known from DE 10 2007 025 352 A1 in which a personalized adaptive cockpit is realized. Depending on a user profile, the represented information can be universally adapted. From a plurality of data determined while operating the vehicle, contexts are determined that take into account properties or actions of the driver or a user of the vehicle. An adaptation of the cockpit is performed depending on these contexts.

From US 2017/0190337 A1, a communication system for a vehicle is known that controls the output of messages to a vehicle occupant. In doing so, the vehicle occupant is monitored by sensors. The output is then controlled depending on parameters that have been obtained from said monitoring of the vehicle occupant.

SUMMARY

An object of the present invention is to provide a method and a device of the aforementioned type in which one or more occupants of the vehicle, for example the driver of the vehicle, are assisted by the automation of a vehicle function, wherein it is ensured that automatically executed processes actually correspond to the preferences of the user.

This object is solved by a method, by a device, and by a computer-readable storage medium with instructions according to the independent claims. Various embodiments of the invention are the discussed in the dependent claims and the following description.

In one exemplary aspect, a method for generating control signals to assist occupants in a vehicle is provided. According to the method, a context of the vehicle is determined;
a rule of a rule-based data system is selected depending on the determined context, wherein the rule-based data system comprises a plurality of rules, wherein each rule has a condition part and a result part, wherein the condition part comprises conditions for the context of the vehicle;
a confidence value associated with the selected rule is determined, wherein the confidence value indicates the probability with which the result of the rule corresponds with the preference of the user;
a result of the selected rule is generated;
a control signal is generated and output depending on the generated rule result, wherein the control signal automates a vehicle function with a degree of automation, wherein the degree of automation depends on the confidence value of the selected rule.

The details of one or more embodiments are set forth in the accompanying drawings and the description below. Other features will be apparent from the description, drawings, and from the claims.

DETAILED DESCRIPTION

Figure 1:
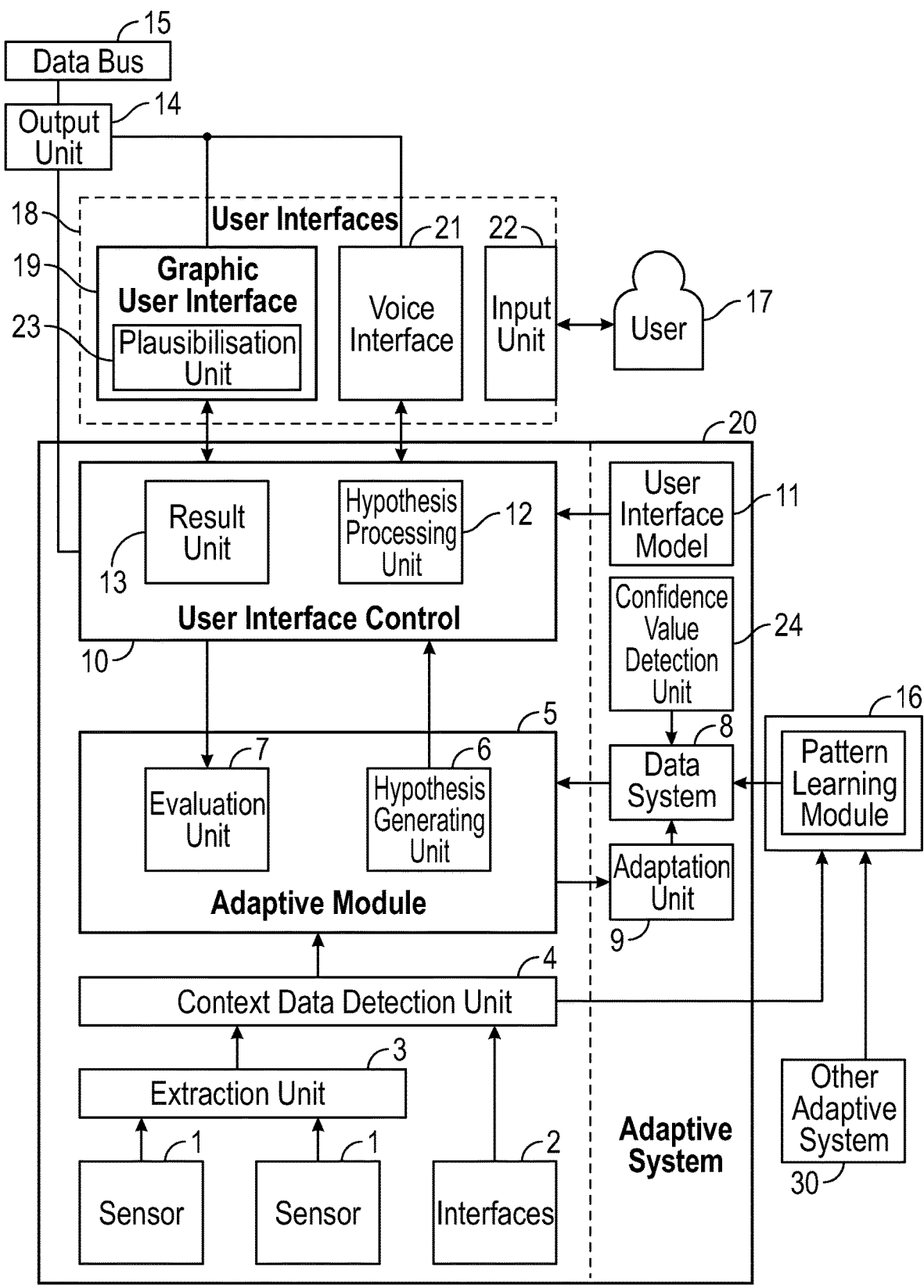
FIG. 1 shows the basic design of an exemplary embodiment of a device for generating control signals.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method according to a first aspect, a context of the vehicle is determined. Depending on the determined context, a rule of a rule-based data system is selected, wherein the rule-based data system comprises a plurality of rules. Each rule has a condition part and a result part, wherein the condition part comprises conditions for the context of the vehicle. Furthermore, a confidence value associated with the selected rule is determined, wherein the confidence value indicates the probability with which the result of the rule corresponds with the preference of the user. Then a result of the selected rule is generated, and a control signal is generated and output depending on the generated rule result. The control signal automates a vehicle function with a degree of automation, wherein the degree of automation depends on the confidence value of the selected rule.

A vehicle function thus is automated by the method according to the present aspect, wherein the degree of automation is selected by means of the confidence value depending on the probability of a user preference.

The "context of the vehicle" is understood herein to be for example the situation in which the vehicle is in. The situation of the vehicle may be derived from the surroundings of the vehicle. Alternatively or in addition, the situation of the vehicle may be derived from states of installations in the vehicle. Finally, the context of the vehicle may be influenced by data that were obtained remote from the vehicle, i.e., not from the surroundings of the vehicle, and are transmitted to the vehicle.

The condition part describes for example the situation in which the rule is valid. The result part corresponds to the preference of the user in this situation, or respectively in this context, that is assumed by means of the rule. The benefit of such rules is that they are machine-interpretable and thus precisely define the behavior of the method, or respectively of the system. Furthermore, they can, however, also be transferred into a natural language representation. This natural language representation may be used in order to explain to the user the logic of a rule and accordingly render plausible the behavior of the method, or respectively the system.

The confidence value of a rule can for example be a relative value from 0 to 1. This confidence value describes the degree to which the method, or respectively the system, is certain that the rule result corresponds to the actual preference of a user. The reliability of the rule is thereby assessed.

In some embodiments, thresholds values are defined that indicate which degree of automation is provided by the control signal at which confidence value. That way, different levels of the degree of automation can be implemented depending on the confidence value.

The degree of automation can furthermore depend on the determined context. For example in a very complex driving task such as in a confusing intersection, the control signal may at most activate a low degree of automation, whereas in a less complex driving task such as on a highway, a high degree of automation can be activated by the control signal. In the latter case, a control signal can for example be generated that activates fully automated execution of the driving task. These threshold values can be adapted and trained individually for a user.

In some embodiments, a user output is generated based on the condition part of the selected rule and the determined context that renders plausible the use of the selected rule to the user. This generated user output is output to the user. Given the user output for plausibilization, the acceptance of the method is increased by a high degree of transparency. The user can also more readily understand the change in the vehicle that was provided by the generated control signal.

In some embodiments, a rule, e.g., a selected rule of the rule-based data system, can be assigned a status value for a status. The status value indicates how to interpret the confidence value of this rule for this rule. The status comprises for example at least one first, one second, and one third status value. With the first status value, the assigned rule is automatically used, with the second status value, the assigned rule is not automatically used, and with the third status value, the assigned rule is used depending on the confidence value of the assigned rule.

The status may for example comprise at least one certain status value, wherein the assigned rule is used depending on the confidence value of the assigned rule. For this certain status value, different outputs can be generated for different levels of automation. This certain status value is for example the aforementioned third status value.

For example and in some embodiments, given the certain status value, a proposal to the user to execute an operation can be actively generated together with a user output that renders plausible the used rule for the user if the confidence value falls to the lowest range, e.g., with a very low confidence value. Furthermore and in some embodiments, given the certain status value, a proposal to the user to execute an operation can be actively generated together without a user output that renders plausible the used rule for the user if the confidence value falls within a second-lowest range, for example with a low confidence value. Furthermore and in some embodiments, given the certain status value, the control signal to automatically execute an operation can be actively generated together with a notification and a user output that renders plausible the used rule for the user if the confidence value falls within a third-lowest range, for example with an average confidence value. Moreover and in some embodiments, given the certain status value, the control signal can be actively generated for automatically executing an operation together with a notification, but without a user output that renders plausible the used rule for the user if the confidence value falls within a fourth-lowest range, for example with a high confidence value. Finally and in some embodiments, given the certain status value, the control signal can be actively generated for automatically executing an operation without a notification and without a user output that renders plausible the used rule for the user if the confidence value falls within a fifth-lowest range, for example with a very high confidence value.

The user thus can accordingly be informed in different ways about the automation of driving functions depending on the confidence value.

In some embodiments, the user is identified, and/or a degree of user experience is determined. The degree of automation then may depend on the determined degree of user experience. Beneficially, the degree of automation can thereby be adapted to the needs of the user.

In some embodiments, a hypothesis for a result of a rule of the data system can be generated depending on the determined context and on the rule-based data system. The generated hypothesis is then output by a user interface. Afterwards, a user input on the output of the hypothesis may then be determined. By means of the determined user input, the output hypothesis may be evaluated. Depending on the evaluation of the hypothesis, the rule-based data system may then be automatically adapted. Depending on the determined context and on the adapted rule-based data system, the result of the rule of the data system may be automatically generated. Subsequently, the control signal may then be generated and output.

The method according to the present aspect, e.g., according to the preceding embodiments, may use one or more of the following embodiments for generating control signals that deliver improved assistance of the vehicle occupants:

A rule-based data system may be used in order to learn behavior patterns and to derive situation-specific hypotheses for the system behavior. Moreover, a cooperative coupling may be used between the adaptive system, i.e., in particular the adapted rule-based data system, and the user interface for a user-centered evaluation of the generated hypotheses. Finally, a design for the adaptive system may be selected that can recognize complex situations by the context, and can derive suitable hypotheses for a rule result. Given the ability to learn that is provided by adapting the rule-based data system, the method can be adapted to a user.

With the method according to the present aspect and in some embodiments, use is made of the user interface in order to validate hypotheses for a rule result by the user. If a recurring hypothesis is increasingly reinforced by the determined user input in the method, the user interface can be reused in order for a hypothesis to be generally evaluated by the user. Accordingly, hypothetical assumptions about potential preferences of a user can become confirmed facts that increase user acceptance with respect to the adaptive method because the method is better adapted to the user. Beneficially, cooperation between data-based learning, or respectively data-based derivation of hypothetical knowledge, and a user interface is accordingly used in order to obtain explicit user feedback. This avoids the disadvantages of methods that are only based on machine learning or algorithms for artificial intelligence.

In the aforementioned embodiments, the administration of knowledge through the adapted rule-based data system and the use of knowledge through the user interface are conceptually separated. Moreover, the use of a rule-based data system may enable certification of the method according to the present aspect since the rules of the rule-based data system are comprehensible. Such certifiability does not exist for example with systems using neurological networks since it is not readily predictable how such a system will react to certain conditions.

By evaluating the context of the vehicle, a situationally appropriate interaction may be achieved. By adapting the rule-based data system, a learning process via the method may result as to how and when the method should interact, or respectively communicate with the user in different contexts. For example, the method can adapt the rule-based data system so that it only offers a user very truncated urgent and important information when the user is driving on the highway, or when it was determined that he is in a driving situation that requires high concentration on the driving situation.

Moreover, the following benefits result from some embodiments:

Individual situative user preferences can be learned through the method. A wide range of preferences of an individual user in different situations can be learned through the method. A hypothesis may be created and output for this, and user input in this regard may be determined. An adaptation of the rule-based data system results from this user input.

The rule valid for this context may be identified in the method based on an underlying quantity of rules for each change of the current context. From this, potential adaptations of the rule-based data system may be derived which hypothetically correspond to user preferences. The user interface may also be adapted in this manner.

By means of the method, dedicated user feedback may be interpreted and processed, and the rule-based data system may be adapted accordingly.

In some embodiments, measured values from sensors and/or data from vehicle interfaces are determined. The context of the vehicle is determined in this case depending on the determined measured values and/or the determined data. By means of sensors and/or interfaces, for example measured values and/or data on the current traffic conditions, the driver behavior, interaction of the driver with another user interface, the current weather conditions, the current ambient light conditions, the current season and/or the current time of day may be determined. This list is only an example; all of the measured values and data relevant to the vehicle and vehicle driving may be determined and processed in a suitable manner.

Furthermore through an interface of the vehicle, it is possible according to some embodiments to integrate so-called fleet knowledge into the context of the vehicle. Fleet knowledge is understood to be data that were collected about a vehicle fleet, i.e., a plurality of vehicles, and that permits conclusions about the context of a single vehicle. By means of the method, the rule-based data system can be adapted based on data that were generated by a plurality of vehicles. In this manner, it is also possible to subsequently expand the rule-based data system with new rules. Beneficially, this makes it possible to monitor the parameterization of certain rules of the rule-based data system within a certain geographic region or under certain contextual influences such as weather, climate conditions, ambient light or time of day throughout a vehicle fleet in order to propose a new rule or adapt an initial parameterization of a rule.

In some embodiments, a more precise value of the condition part and the result part may be learned by adapting the rule-based system, e.g., for an appropriate rule. The rule may be parameterized in this way in order to depict the best possible user preference. Furthermore, it is possible in some embodiments to use data-driven methods in order to learn new rules. The hypothesis may accordingly comprise an assumption about a user preference for the rule result of the hypothesis in the determined context.

The confidence value may furthermore be changed while the method is being executed. It is therefore part of the adaptation of the rule-based data system. In this case, the change may occur as a consequence of active interactions with a user. In some embodiments, the confidence value may change according to a certain user input.

The rules of the data model are assumptions about potential user preferences. Based on the rules and the hypotheses, the method therefore may derive potential hypothetical preferences for a context that correspond to the actual user preference with a certain confidence, i.e., with a certain probability. Since the confidence value in the method is first calculated based on the previously determined data about the context, i.e., for example about situative user interactions, the knowledge that exists in this case about the user preferences is always hypothetical. If in the method according to some embodiments the a hypothesis has been derived for a context that most probably corresponds to the user preference, the method interacts through the user interface with the user in order to convert hypothetical assumptions into confirmed facts. In this case, a user interface may be used in order to, for example, give the user a recommendation that he can confirm. Furthermore, the user may for example be offered for a certain rule to always be automatically used in the future. The user can agree to this automation through a user input. By the adaptation of the rule-based data system, certainty then exists about the correctness of this rule, and the user can then be assisted with the execution of this rule. Accordingly, the user interface is used in order to request explicit feedback from the user on hypothetical assumptions, and in order to undertake the adaptation of the rule-based data system such that it is increasingly adapted to the user. In the event that the user contradicts a rule through a user input, the rule-based data system can be adapted to reduce the confidence of the rule in order to use the rule less frequently afterward. This increases user acceptance since the rule-based data system can experience definite certainty about potential user preferences.

Consequently, the user input may comprise a confirmation or a rejection of the hypothesis. When the hypothesis is rejected, e.g., the confidence value of the rule belonging to the hypothesis is reduced. When the hypothesis is confirmed, the confidence value of the rule belonging to the hypothesis is increased. Moreover, the user input, or several user inputs, may induce an activation or deactivation of the rule belonging to the hypothesis.

If the user is identified according to some embodiments, the rule-based data system may also be adapted in a user-specific manner. Beneficially, this makes it possible to quickly adapt the method to an initial user without data about interactions with this user being determined beforehand. The rule-based data system that is designed to be user-specific may be downloaded through a vehicle interface once a user in the vehicle has been identified. The user-specific rule-based data system may thereby and in some embodiments also be used for a certain user in rented vehicles, second vehicles or subsequent vehicles as well. In addition, such a rule-based data system may in some embodiments also be applied to more restricted or more potent vehicle platforms. In contrast to neural networks, quantities of rules can namely be easily restricted to smaller domains or embedded in larger domains. Even when the functional nature of a subsequent vehicle platform differs, function-specific transformation models may be used to parameterize the rule set which adapt the rule-based data model to the new vehicle platform. Beneficially, the rule-based system used by the method may accordingly be transferred very effectively.

In this case, the method may be designed to be very user-centered. This ensures the economic development and viability. It can offer added value to the user for years over the entire time of use. By means of the method, user preferences may be correctly learned in order to offer the user the control signals for a desired function or information on the desired type of interaction at the correct moment and in the correct situation. Because of this, the acceptance may be increased.

According to some embodiments, hypothesis-independent user input is also acquired that is independent from the output of a hypothesis. The hypothesis-independent user input is evaluated, and the rule-based data system is automatically adapted depending on the result of the evaluation. In this way, the rule-based data can be individualized. The user may additionally define the behavior of the method. This is, e.g., possible since a rule is comprehensible to the user. The user may therefore specifically change rules or add new rules through the user interface that expand the method.

In another aspect, a device is provided for generating control signals to assist occupants in a vehicle that comprises a context-detection unit for determining the context of the vehicle. It furthermore comprises a result unit that is designed to select a rule of a rule-based data system depending on the determined context, wherein the rule-based data system comprises a plurality of rules, wherein each rule has a condition part and a result part, wherein the condition part comprises conditions for the context of the vehicle. The result unit is furthermore designed to generate a result from the selected rule. Moreover, the device comprises a confidence-detecting unit that is designed to determine a confidence value assigned to the selected rule, wherein the confidence value indicates the probability with which the rule result corresponds to the rule for the user preference. Finally, the device comprises an output unit for generating and outputting a control signal depending on the generated rule result, wherein the control signal automates a vehicle function with a degree of automation, wherein the degree of automation depends on the confidence value of the selected rule.

The device may in some embodiments be designed to execute the method according one or more embodiments of the preceding aspect.

Furthermore and according to another aspect, a computer program is provided comprising commands that, when executed by at least one computer, cause the computer to execute the method according to the first aspect.

The method and the device according to some embodiments are easy to be adapted by a developer. The rule-based data system of the method, or respectively the device, can be adapted, e.g., in that the developer can explicitly define how the method, or respectively the device should behave in specific events. For example, the developer is able to specify in advance for the system to not pursue system adaptation for a specific time period in an event in which the user rejects a system adaptation.

Given the use of a rule-based data system, the method and device are certifiable. This certifiability is possible before the method is used, or respectively before the device is used. That way, it can be ensured that the device and the method do not manifest, learn or assume any behavior that is undesirable. This is, e.g., important for automated driving functions. This is ensured by the use of a rule-based data system since the adaptation is explicitly defined by the amount of rules. Thus, the adaptation of the rules is known before the method is executed and can accordingly be certified and released. The method and the device may be configured so not to undertake any adaptation that has not been previously defined.

In addition, the rule-based data system can be initially defined in some embodiments. In doing so, it is not yet necessary for the data on the interactions of a user to have been determined. Accordingly, first users of the device and the method can profit directly from the generated control signals. In addition, the status and the confidence of a rule can be initially defined so that the method and the device can already generate control signals in the initial interaction with the user without the user having to use the device, or respectively the method beforehand for a long time, and without data having been determined beforehand. For the initial implementation of the method, or respectively of the device, expert knowledge can for example be integrated. For example, rules defined by experts that describe the appropriate use of vehicle systems can first be initialized as rules with a higher confidence. Even for an inexperienced driver, helpful control signals can thereby also be generated for functions that the user has not previously used. For example, activating an assistance system can be recommended to a user when the use of this system is recommendable in the current context. Such recommendations can also be derived from fleet data.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

First, the design of the device according to an embodiment will be described with reference to FIG. 1.

The device according to the present embodiment is generally provided by an adaptive system 20 and the linkages of this adaptive system 20 to other apparatuses in a vehicle and outside of the vehicle.

The vehicle comprises a plurality of sensors 1 and interfaces 2 with which measured values and data can be determined. The sensors 1 may for example comprise measured values on the current weather conditions, the current ambient light conditions, the current season and the current time of day. In addition, sensors 1 may be provided that monitor the driver's behavior and determine interactions of the driver with a user interface. Moreover, sensors 1 may supply measured values on driving parameters such as for example the current speed, any existing slip of the wheels and other measured values that are normally evaluated by driver assistance systems that are known per se. Data on the current traffic conditions in the surroundings of the vehicle or on the route of a vehicle as well as regional weather conditions can be received through the interfaces 2. The interfaces 2 may also enable the transmission of data through the mobile phone network or the Internet in order to link the vehicle to external services that are operated in a cloud or on a central server of the vehicle manufacturer. In this manner, any data can be transmitted to the vehicle that are relevant for the context of the vehicle.

In addition, the interfaces 2 may establish a link to mobile devices within the vehicle. Moreover, communication with other vehicles or infrastructure apparatuses such as traffic guidance systems and stoplights may be possible through the interfaces 2.

By means of the sensors 1 or the interfaces 2, a certain user 17 who is an occupant of the vehicle can also be identified. For example, one of the sensors 1 is designed as a user identification unit. Alternatively, the user is identified via an interface such as through an input. In this manner, all adaptations that are described below are executed in a user-specific manner.

The sensors 1 are linked to an extraction unit 3 by means of which the raw data of the measured values of the sensors 1 can be converted into data with superior features. For example, the current speed can be continuously determined by means of a sensor 1. The extraction unit 3 in this case can continuously analyze this quickly-changing data and derive the information that the user has been driving at a constant speed since a particular point in time. In addition to determining raw data, the extraction unit 3 enables the adaptive system 20 to determine and recognize complex situations in highly dynamic heterogeneous data about the driver, the vehicle and the surroundings. In doing so, the extraction unit 3 can use technologies of artificial intelligence (such as deep learning and time series analysis).

The data obtained by the extraction unit 3 are transmitted to a context data detection unit 4. At the same time, the data received via the interfaces 2 are also transmitted to this context data detection unit 4. In the context data detection unit 4, all available data transmitted by the sensors 1 and the interfaces 2 are analyzed and if applicable aggregated. The context data detection unit 4 generates a continuously adapted description of the context in which the vehicle is located. For example, the current situation is determined in which the vehicle is located. The determined vehicle context is transmitted on the one hand to an adaptive module 5 of the adaptive system 20 and on the other hand via a suitable interface to an external pattern learning module 16.

The adaptive module 5 also comprises a hypothesis-generating unit 6 and an evaluation unit 7. The hypothesis-generating unit 6 is designed to generate a hypothesis for a result of a rule of the data system 8 depending on the context determined by the context data detection unit 4, and depending on a rule-based data system 8 to which the adaptive module 5 is linked.

The rule-based data system 8 is a memory in which a plurality of rules is saved in a structured manner. Each rule has a condition part and a result part, wherein the condition part comprises conditions for the context of the vehicle. The rule-based data system 8 accordingly contains the amount of rules that define how the adaptive system 20 behaves in different situations. Moreover, it includes information for each rule with respect to its confidence and its status, as will be explained later on. The rule-based data system 8 can be divided into subsystems that differ in terms of the origin of their rules. The rule-based data system 8 is furthermore linked to the external pattern learning module 16. By means of this external pattern learning module 16, new rules can be defined and transmitted to the rule-based data system 8.

The hypothesis-generating unit 6 accesses the rules of the rule-based data system 8. It can resolve the quantity of rules of the data system 8 with reference to the current situation, or respectively the current context. In each situation, the hypothesis-generating unit 6 iterates with respect to the amount of rules of the rule-based data system 8 and identifies the rules appropriate to the context. The rule results of this quantity of identified rules represent a quantity of hypotheses about the preferences of the user or the current context, or respectively the current situation. Each of these identified rules appropriate for the context, and their rule results, are transmitted in the form of a list of hypotheses to a user interface control 10.

The user interface control 10 comprises a hypothesis-processing unit 12 and an result unit 13. Furthermore, the user interface control 10 is linked to a user interface model 11.

The hypotheses received by the hypothesis-generating unit 6 are processed by the hypothesis-processing unit 12. The hypothesis-processing unit 12 determines how the adaptive system 20 should behave depending on a hypothesis. To accomplish this, it decides if the rule represents a potential preference of an individual user on the basis of the confidence and the status of each rule on which the hypothesis is based. Furthermore, the hypothesis-processing unit 12 decides on this basis whether a rule on which the hypothesis is based is executed automatically, whether to offer or recommend to the user the use of the underlying rule, and decides how it is to interact with the user. In doing so, the user interface control 10 also establishes the user interface through which to interact with the user. A graphic user interface 19 and a voice interface 21 can for example be provided as the user interfaces 18.

The hypothesis-processing unit 12 can for example decide to inform the user about the automatic activation of the seat heater via the voice interface 21 by outputting synthetic speech. The use of the rule on which the hypothesis is based can thus be rendered plausible to the user by indicating the reason why the seat heater is being automatically activated. For example, it can be output by speech that the user frequently used the seat heater recently when the outside temperature corresponded to the current temperature. The specific decision-making logic for this and the data on how to convert a rule into natural speech is defined and modulated in the user interface model 11. An alternative to voice-based information output for the user is for example the depiction of information, by means of a graphic user interface 19 that the seat heater has been activated. In doing so, a button can be displayed by means of which the execution can be reversed. If a certain rule on which the hypothesis is based is recommended to the user, the hypothesis-processing unit 12 can use the voice interface 21 in order to actively offer the user the recommendation and carry out a dialog with the user about this. If the user for example asks why the adaptive system 20 concluded that he probably wanted to use the seat heater, the hypothesis-processing unit 12 can explain this by means of the voice interface 21. If the user ignores two sequential recommendations of the adaptive system 20, the hypothesis-processing unit 12 can for example decide that no further rule will be executed for a specific time for this user.

The hypothesis-processing unit 12 is accordingly configured to establish when and during which cycles it is to be learned from implicit feedback actions whether a certain rule fits a current user 17 that was identified beforehand. For example, for the function of the seat heater of the vehicle, it can be defined that, based on implicit knowledge, learning should only occur during the first two minutes of each trip whether a rule for the seat heater function fits a user interaction pattern. If a certain rule in a certain situation that results from the context is valid within the first two minutes, and the user 17 activates the seat heater on his own initiative, the rule is interpreted as being fitting, and an adaptation of the rule is initiated. If cyclical learning is defined in the hypothesis-processing unit 12 for a certain rule, the adaptation of the rule is initiated in a previously defined cycle as long as the conditions for this are met.

The user interface model 11 is established beforehand. In doing so, it is defined how to proceed with a specific rule, or respectively a specific hypothesis of a certain function or domain with a certain confidence with a given status. How the user interfaces 18 are used to communicate the system behavior is thereby established. Moreover, how a rule or a hypothesis can be usefully converted into natural speech is defined. To accomplish this, various text modules can be saved in the user interface model 11, or a generator for natural speech is used. Examples of text modules are the name of a sensor 1, the condition value of the rule for a sensor 1, the current actual value of the sensor 1, the name of an actuator and the value of the actuator to set. Moreover, it can be defined in the user interface model 11 that the adaptive system 20 stops executing rules for a certain domain, for example for a specific period, when the user 17 has ignored the execution of rules of this domain several times. The domains can differentiate various areas of vehicle functions.

The user interfaces 18 generally comprise a quantity of available user interfaces in order to interact with the user. In doing so, the user interfaces 18 are controlled by the user interface control 10. That way, an execution of a rule is communicated or offered to the user 17, or feedback is requested from the user, or the user is informed about an automation. In doing so, the user 17 is offered suitable user input in order to have an influence on the evaluation of a hypothesis, or on the execution of a rule.

The user interfaces 18 can, e.g., be controlled by the user interface control 10, output the hypotheses generated by the hypothesis-generating unit 6. Upon such an output of the hypothesis, a user input can be determined by means of an input unit 22. The input unit 22 is also part of the user interfaces 18.

The user input, or respectively in general the user feedback, can occur in various ways as a response to the output of a hypothesis. For example, the user may ignore a recommendation that is contained in the output hypothesis. It may also explicitly reject or challenge such a recommendation. For example, a recommended automation may be challenged. Moreover, the user may accept a recommendation contained in the hypothesis, or ignore an automation. Moreover, the user may reverse an automation. Finally, the user may provide dedicated feedback to a recommendation or an automation by for example adapting the condition part or the result part of a certain rule on which the hypothesis is based. For example, the user may enter that the seat heater should be activated at 13° C. instead of at 12° C., and that level 3 should be activated instead of level 2.

The explicit feedback by the user 17 through the user input is transmitted to the hypothesis-processing unit 12 of the user interface control 10 which then transmits it back to the adaptive module 5. This user feedback by the user input into the evaluation unit 7 is processed in the adaptive module 5. The evaluation unit 7 is designed to pursue an additional evaluation of the previously output hypothesis. The evaluation unit 7 is assisted in this by the data that were transmitted by the hypothesis-processing unit 12. The evaluation unit 7 is, e.g., designed to evaluate the previously output hypothesis by means of the determined user input.

The evaluation unit 7 is designed to learn which rules, or respectively hypotheses, fit which parameterization for an individual user 17 and hence correspond to his preferences. The evaluation unit 7 therefore guarantees the adaptation of the adaptive system 20.

The evaluation of a hypothesis is transmitted by the evaluation unit 7 to the adaptation unit 9. Depending on the evaluation of an output hypothesis, the adaptation unit 9 can automatically adapt the rules of the rule-based data system 8. By means of the adaptation unit 9, a hypothesis that was generated beforehand by the hypothesis-generating unit 6 and validated by the evaluation unit 7 can accordingly be used to adapt the rule-based data system 8.

Automated learning and the adaptation of the system 20 can occur based on two information classes. The evaluation unit 7 can evaluate interactions of a user and thereby obtain implicit feedback. Furthermore, the evaluation unit 7 can obtain explicit user feedback on output hypotheses as described.

The evaluation unit 7 obtains implicit feedback about data that were determined during interactions with the user 17. The evaluation unit 7 receives certain context data from the context data detection unit 4 that supply a description of the situation in which the vehicle is found. Now it can be determined in which situation the user uses a function on his own initiative and how he adjusts it. This determined information is termed implicit feedback. The evaluation unit 7 determines for example when the seat heater is activated on the user's initiative and checks which rules of the rule-based data system 8 correspond to this pattern. If one of the rules fits this pattern in the implied feedback, the evaluation unit 7 can conclude that this rule corresponds with a high probability to the preference of the user 17. In this case, the evaluation unit 7 can increase the confidence value of the corresponding rule via the adaptation unit 9. Accordingly for example, the confidence value would increase after repeated activation of the seat heater by the user 17 consistently in the same situation so that the hypothesis-generating unit 6 and the hypothesis-processing unit 12 would decide to generate an output which recommends executing the corresponding rule to the user, or to even automate the rule for him.

Explicit user feedback is understood to mean that the output of a hypothesis to the user 17 initiates user input which indicates how the hypothesis is to be evaluated. The adaptive system 20 can thereby learn the extent to which the rule that belongs to this hypothesis corresponds to the user preference, and can then correspondingly adapt the rule-based data system 8 via the adaptation unit 9.

In the following, details will be explained of how a rule adaptation is initiated, and the manner in which a rule is then adapted.

To adapt the rule, the adaptation unit 9 comprises an instance which defines how it is learned whether a rule corresponds to the preferences of the user 17 based on implicit and explicit feedback from the user 17. The adaptation is initiated either when the pattern of the respective rule was ascertained in the implicit feedback of the user 17 and the evaluation unit 7 initiates the adaptation process, or when the user 17 provides explicit feedback through user input via the user interfaces 18 on a certain rule.

The rules of the rule-based data system 8 comprise a condition part and a result part. The condition part comprises conditions for the context of the vehicle in which the rule is executed. The probability that the execution of the rule corresponds to the preferences of the user 17 is indicated by a confidence value of the rule. This confidence value is determined by a confidence value detection unit 24 that is connected to the rule-based data system 8. In the adaptation of a rule, this confidence value can be changed. The adaptation unit 9 differs between the different forms of user feedback. In an adaptation that is based on implicit knowledge, the confidence value is only raised or lowered slightly. Contrastingly with explicit feedback in which a hypothesis is output and a user input in this regard has been determined, a much stronger change of the confidence value occurs since an explicit evaluation by the user 17 with regard to the hypothesis has been determined. Moreover, the status of a rule may be changed. The rule may be activated, deactivated, or the status may be set so that the rule is used depending on the confidence value.

A rule can for example be adapted by the adaptation unit 9 such that when an automation of a rule is repeatedly reset or canceled, the rule is deactivated, and the confidence value is set to zero.

If the user 17 was offered an execution of a rule in the hypothesis and the user accepted it, the rule can additionally be assigned a higher confidence value. In this case, following the execution of an assigned rule, the hypothesis-processing unit 12 can for example decide to directly offer the user the automation of this rule, or respectively the status of the rule is set to "activated". For example, there can be the voice output: "Would you like me to always activate the seat heater when it is colder than 12° C. in the morning?"

Moreover, through user input, it is possible for the user 17 to deactivate a rule that belongs to the output hypothesis. In this case, the evaluation unit 7 sets the status of the rule to "deactivated" by means of the adaptation unit 9. If over the course of time a deactivated rule has a gradually rising confidence value, the hypothesis-processing unit 12 can again generate a hypothesis through the hypothesis-generating unit 6, despite the rule status of "deactivated", and can generate an output that offers to reverse the deactivation of this rule for the user 17. In this case, for example, the output through the voice interface 21 can be as follows: "I know that you do not want the seat heater to be automated. However, since you have used the seat heater in this situation several times, I could cancel the deactivation of the rule for you and activate the rule."

If the user has been identified through one of the interfaces 2, then the rule-based data system 8 can also be adapted to the specific user. In doing so, it is determined through the explicit user feedback whether certain rules for which hypotheses were output match the individual preferences of the identified user 17. The rules can then be adapted for a specific user. If for example user input has been determined that a certain rule corresponds to the preference of a certain pattern, it can be inferred from the situation previously determined through the context which seat heater level a certain user has set the most. To infer the matching actuator value, various heuristics and methods can be used. This learning process for parameterizing a rule can be used analogously for the sensor values of the condition part. If no clear pattern can be inferred for parameterization, a hypothesis can be generated and output to the user through one of the user interfaces 18. Through a user input, the user 17 can then provide explicit feedback that is evaluated, after which the corresponding rule can be adapted in a user-specific manner. The output of the hypothesis can for example be worded as follows: "I have noticed that you normally activate the seat heater in situation "s". Do you want me to automate this rule for you? If yes, at what level should the seat heater be activated for you?"

Moreover, the adaptation unit 9 can change the rule-based data system 8 in other ways. For example, the adaptation unit 9 can ensure that the rule-based data system 8 does not contain any contradictory rules or logic. It can for example perform a consistency test. Moreover, the adaptation unit 9 can be used to ensure domain-specific requirements by identifying rules and then deactivating those that contradict these requirements. For example, a climate domain could stipulate that no rule should activate the seat heater if a child seat is placed on the seat. Such an adaptation of the rule-based data system 8 by the adaptation unit 9 also leads to the fact that the system which can learn by itself remains certifiable.

In addition to the adaptive system 20 for one's own vehicle, a plurality of other adaptive systems 30 of other vehicles can be provided. The other adaptive system 30 is representative for a plurality of adaptive systems of a fleet that is used by different users. These other adaptive systems 30 can also transmit context data to the pattern learning module 16.

The pattern learning module 16 is for example executed on the server of the vehicle manufacturer or in a cloud. In doing so, all context data are collected from all adaptive systems 20, 30. Since the pattern learning module is executed externally, i.e., independent of the vehicle, it can access much greater memory and computing resources. That way, additional analyses of the determined data can be performed in the pattern learning module 16. By means of the pattern learning module 16, the determined data, e.g., the context data are analyzed further in order to learn new rules. Methods of artificial intelligence and machine learning can be used for this. For example, deep learning is a technology that poses stringent demands on the computing power of a system and is suitable for analyzing the data. In this case, the pattern learning module 16 can learn new rules based on the data of an individual user, or based on fleet data. In the case of fleet data, for example all situations, or respectively contexts can be investigated in which users drive on a certain road in order to learn rules for a context of this certain road. Newly learned rules are either entered in a specific rule-based data system 8 of a user, or are transmitted to all rule-based data systems 8 of the fleet. For the sake of quality assurance, rules newly learned by the pattern learning module 16 can be checked, certified and possibly released or deleted by experts before being transmitted to a rule-based data system 8 of an adaptive system 20, 30.

In such an active learning process, certain situations can be intentionally learned in order to thereby verify hypothetical knowledge in the external pattern learning module 16. To do this, rules with a low confidence value can be generated in the pattern learning module 16 and transmitted to adaptive systems 20, 30 of a vehicle, and the development of the confidence value of this rule is monitored in the individual adaptive systems 20, 30.

After the rule-based data system 8 has been adapted through the output of a hypothesis and subsequent hypothesis evaluation by the adaptation unit 9, a result unit 13 can execute a rule if the user interface control 10 has determined that a hypothesis should not be output. The result unit 13, depending on the determined context and on the possibly adapted rule-based data system 8, generates a result of a rule of this data system 8. This rule result is transmitted to an output unit 14 that generates and outputs a control signal depending on the generated rule result. This control signal can be transmitted to the user interfaces 18 in order to output certain information. Furthermore, the control signal can be transmitted to a data bus 15 that makes it possible to control the different apparatuses of the vehicle. For example, the different assistance systems of the vehicle can be controlled, the media player can be controlled, different climate functions can be executed, lighting can be controlled, or control signals can be transmitted to external devices such as a smartphone located in the vehicle.

According to another exemplary embodiment, the result unit 13, independent of whether or not the rule-based data system 8 was adapted, can select a rule from the rule-based data system 8 depending on the determined context. The result unit 13 generates a result for this selected rule. As described above, the rule result is transmitted to the output unit 14 which generates and outputs a control signal. Moreover, a plausibilization unit 23 is integrated in the output unit 14. By means of this plausibilization unit 23, a user output can be generated based on the condition part of the selected rule and the determined context that renders plausible the automatic execution of a rule for the user. This user output can then be output by voice via the voice interface 21 or by text via a display. This user output contains a voice and/or text output of the condition part and/or result part of the selected rule. Moreover, the confidence value that is assigned to the selected rule is output. Alternatively, the user output can also be generated depending on the confidence value. With a low confidence value, the user output for plausibilizing the use of the selected rule is more detailed than with a higher confidence value. Moreover, the above-described status value of the selected rule can be contained in the user output.

In one exemplary embodiment, the control signal automates a vehicle function. For example, functions of an assistance system can be activated that remove parts of the task of driving from the driver. Moreover, a control unit can be addressed through the data bus 15 that initiates partially automated or fully automated driving of the vehicle. The control signal accordingly automates a vehicle function with a certain degree of automation. In one exemplary embodiment, the degree of automation depends on the confidence value of the selected rule. For example, a higher degree of automation such as for example fully automated driving of the vehicle can only be activated by a rule that has an extremely high confidence value. A driving function with a low degree of automation such as for example automatically controlling vehicle lighting functions can also be activated by a rule that possesses a low confidence value. In addition, the degree of automation of the vehicle function controlled by the control signal depends on the determined context of the vehicle. With a highly complex driving task, a lower degree of automation is controlled by the control signal at a certain confidence value than is the case with an easier driving task such as for example on a highway.

If the driver was also identified as the user for example by a sensor 1, the degree of user experience is determined by means of the context data detection unit 4. The degree of automation then furthermore depends on the degree of user experience. With an experienced user, a greater degree of automation can be selected than is the case with a less experienced user. For certain driving functions, a higher degree of automation can also conversely be activated for a less experienced driver in order to assist the less experienced driver.

As explained above, a status value for a status is assigned to a rule. With the third status value, an assigned rule is used depending on the confidence value. Depending on the confidence value, this third status value can be further divided into different automation levels for the degree of automation in which the control signal controls different additional outputs to the user.

If there is a very low rule confidence value, i.e., when the confidence value for example falls within the lowest range, a proposal to execute an operation is actively generated for the user together with a user output that renders plausible the used rule for the user, as was explained above.

If there is a low confidence value, i.e., when the confidence value for example falls within a second-lowest range, a proposal to execute an operation is actively generated for the user without a supplementary user output that renders plausible the used rule for the user.

If there is a moderate confidence value, i.e., when the confidence value for example falls within a third-lowest range, the control signal for automatically executing an operation is actively generated together with a notification and a user output that renders plausible the used rule for the user. The notification informs the user about the execution of the control signal, and the user output renders plausible the used rule.

If there is a higher confidence value, i.e., when the confidence value for example falls within a fourth-lowest range, the control signal for automatically executing an operation is actively generated together with a notification, but without a user output that renders plausible the used rule for the user.

If there is a very high confidence value, i.e., if the confidence value for example falls within a fifth-lowest range, or respectively the highest range for the confidence values, the control signal for automatically executing an operation is actively generated without a notification and without a user output to render plausible the used rule.

According to a further exemplary embodiment, the rule-based data system 8 is designed user-specific. This user-specific, rule-based data system 8 is saved in a vehicle-external memory such as in a cloud. This is represented in FIG. 1 by the dashed line of the adaptive system 20. After a user has been identified, for example by a sensor 1, the user-specific, rule-based data system 8 for the identified user is transmitted to the vehicle. As explained above, it can then optionally be used by the adaptive module 5, by the user interface control 10, and, e.g., by the result unit 13. In this case, the rule-based data system 8 is however transformed depending on the determined current context so that the transformed rule-based data system 8 can be used in the determined current context. The transformed, rule-based data system 8 can be saved outside the vehicle, but for example in a vehicle-internal memory. If for example a user uses different vehicles, the user-specific rule-based data system 8 can be uploaded to a vehicle once this user has been identified in the vehicle. The behavior learned in a vehicle is accordingly made available to the user in another vehicle as well. In doing so, however, the rule-based data system 8 is transformed in order to adapt to the current context.

If the rule-based data system 8 about a user was for example trained in Germany in winter with respect to the climate preferences of the user, and this user then travels to a warm vacation area and rents a vehicle there, the rule-based data system 8 is uploaded to this rented vehicle. Since this rented vehicle is however located in a different context, that is, in a warmer environment, the rule-based data system 8 is transformed, which causes an adaptation to the new context. For example, the rule-based data system 8 can be adapted to a different temperature sensitivity in the event of a different humidity level.

For example when the rule-based data system 8 is transformed, the degree of automation is adapted as was explained above.

Furthermore, the confidence value of a hypothesis or a rule can be adapted during the transformation. Furthermore, a condition part of a rule can be adapted and/or expanded during the transformation. The adaptations comprise, e.g., an addition, a subtraction, an extension or contraction of a certain value. When the condition part is expanded, certain attributes may, e.g., be added such as humidity-specific attributes.

After the transformed rule-based data system 8 has been generated, a rule can be selected as explained above, a result of the selected rule can be generated, and a control signal can be generated and output depending on the generated rule result. An additional user output for rendering plausible the selected rule can also be made.

Figure 2:
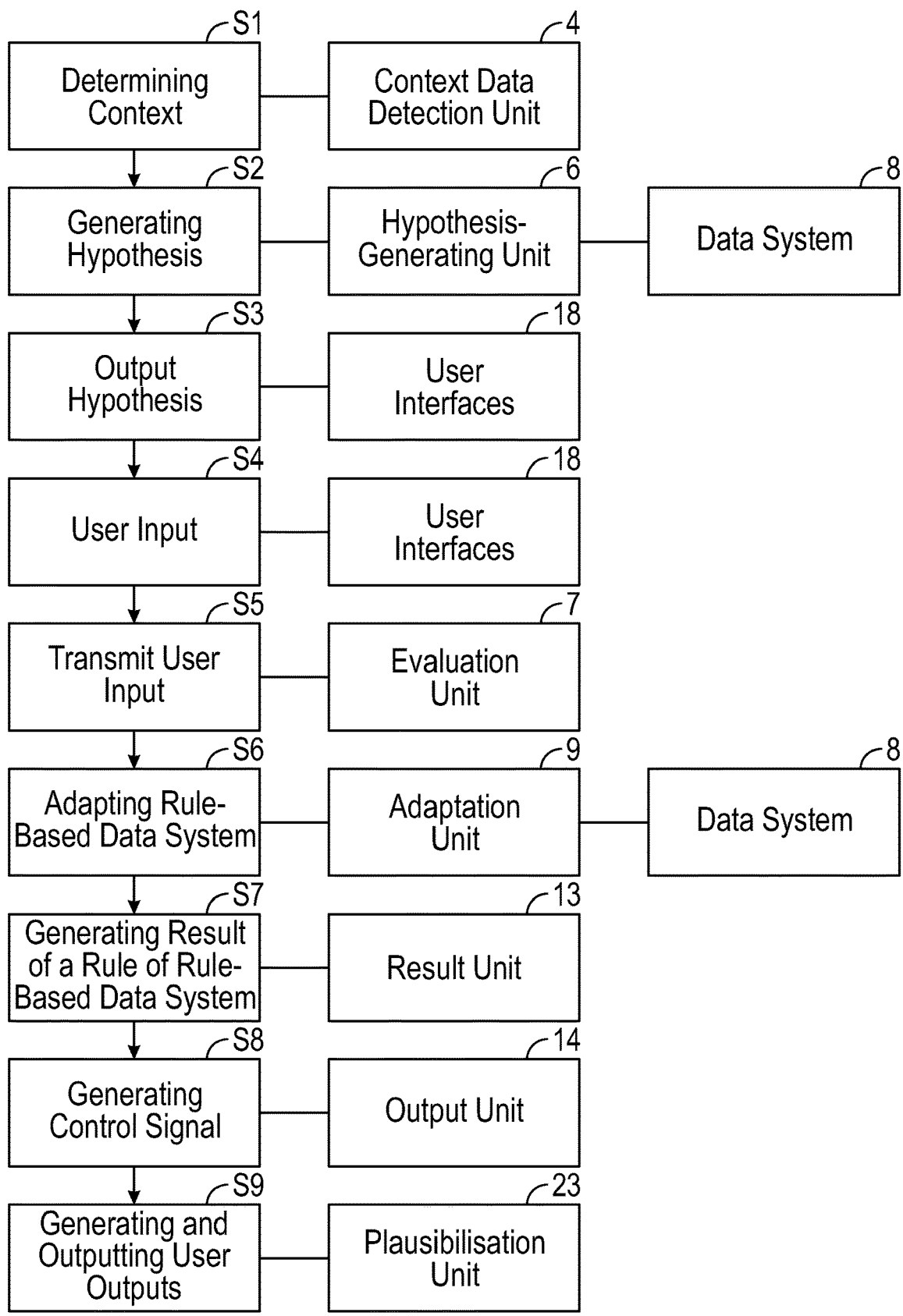
FIG. 2 shows the process of an exemplary embodiment of a method for generating control signals.

With reference to FIG. 2, an exemplary embodiment is explained that can be executed using the above-explained device:

The context of the vehicle is determined in step S1. To do this, the context data detection unit 4 is accessed that in turn accesses the extraction unit 3, the interfaces 2 and the sensors 1. In step S1, the user can also be identified.

In step S2, a hypothesis for a result of a rule of the rule-based data system 8 is generated depending on the determined context and on the rule-based data system 8. To accomplish this, the hypothesis-generating unit 6 is accessed that in turn downloads rules from the rule-based data system 8.

In step S3, the hypothesis is output. To accomplish this, the user interfaces 18 are used.

In step S4, a user input is used to output the hypothesis. This user output is again made through the input unit 22 of the user interfaces 18.

The user input is transmitted to the evaluation unit 7 that evaluates the hypothesis in step S5.

Depending on the evaluation of the hypothesis, the rule-based data system 8 is then automatically adapted by means of the adaptation unit 9 in step S6. If, by means of the hypothesis-processing unit 12, the user interface control 10 has determined that a validation of a hypothesis or user feedback is unnecessary, a result of a rule of the data system is generated in step S7 depending on the determined context, and on the adapted rule-based data system 8. To accomplish this, the user interface control 10 accesses the result unit 13.

In step S8, a control signal is generated depending on the generated rule result that is output in a suitable manner by means of the output unit 14.

According to a development of the method, during the adaptation of the rule-based data system, fleet knowledge can also be accessed in step S6 that is transmitted to the rule-based data system by the pattern learning module 16. In this way, new rules can be injected into the rule-based data system 8, or the rules of the rule-based data system 8 can be adapted on the basis of data that were obtained by another adaptive system 30.

According to a development of the method, a user output can be generated based on the condition part of the selected rule and the determined context that renders plausible the use of the selected rule to the user. To do this, the plausibilization unit 23 is accessed. This user input is also output in a suitable manner by means of the output unit 14. The user output contains voice and/or text output of the condition part, and/or the result part of the selected rule, as well as the confidence value and the status value of the selected rule. To accomplish this, all outputs are transformed into a natural speech message in order to render the use of the selected rule understandable to the user. To accomplish this, the user interface model 11 can be accessed.

In one exemplary embodiment, a control signal is generated and output in step S8 that automates a vehicle function with a degree of automation as presented above. The degree of automation depends in this case on the confidence value of the selected rule. Furthermore, user outputs can be generated and output in step S9 that render plausible a used rule for the user as was explained above. Whether such user output is generated depends in this case on the confidence value of the selected rule. Furthermore, a notification can be output possibly depending on the confidence value as explained above.

According to another exemplary embodiment, the user is identified in step S1. Then before step S2, the user-specific rule-based data system 8 saved outside the vehicle for the identified user is transmitted to the vehicle and sent to the transformed rule-based data system 8. Then steps S2 to S6 can optionally be performed. Then in step S7, a rule result is generated depending on the determined context and the transformed, possibly adapted, rule-based data system 8, and afterwards, the control signal is generated and output in step S8.

REFERENCE NUMBER LIST

1 Sensors; user identification unit
2 Interfaces
3 Extraction unit
4 Context data detection unit
5 Adaptive module 6 Hypothesis-generating unit
7 Evaluation unit
8 Rule-based data system
9 Adaptation unit
10 User interface control
11 User interface model
12 Hypothesis-processing unit
13 Result unit
14 Output unit
15 Data bus
16 Pattern learning module
17 User
18 User interfaces
19 Graphic user interface
20 Adaptive system
21 Voice interface
22 Input unit
23 Plausibilisation unit
24 Confidence value detection unit
25 Transformation unit
30 Additional adaptive system The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating control signals to assist occupants in a vehicle, comprising:
   determining a context of the vehicle;
   selecting a rule of a rule-based data system depending on the determined context, wherein the rule-based data system comprises a plurality of rules, wherein each rule has a condition part and a result part, wherein the condition part comprises conditions for the context of the vehicle;
   determining a confidence value associated with the selected rule, wherein the confidence value indicates a probability with which a result of the rule corresponds with a preference of a user;
   generating the result of the selected rule; and
   generating and outputting a control signal depending on the generated rule result, wherein the control signal provides an automation of a vehicle function, wherein the automation depends on the confidence value of the selected rule; wherein
   at least one rule of the rule-based data system is assigned a status value for a status, wherein the status value indicates how the confidence value of this rule is to be interpreted for this rule;
   wherein the status comprises at least one certain status value, wherein the assigned rule is used depending on the confidence value of the assigned rule; and wherein
   given the certain status value, a proposal to the user to execute an operation is actively generated together with a user output that renders plausible the used rule for the user if the confidence value falls to the lowest range; and/or
   given the certain status value, a proposal to the user to execute an operation is actively generated together without a user output that renders plausible the used rule for the user if the confidence value falls within a second-lowest range.

2. A method for generating control signals to assist occupants in a vehicle, comprising:
   determining a context of the vehicle;
   selecting a rule of a rule-based data system depending on the determined context, wherein the rule-based data system comprises a plurality of rules, wherein each rule has a condition part and a result part, wherein the condition part comprises conditions for the context of the vehicle;
   determining a confidence value associated with the selected rule, wherein the confidence value indicates a probability with which a result of the rule corresponds with a preference of a user;
   generating the result of the selected rule; and
   generating and outputting a control signal depending on the generated rule result, wherein the control signal provides an automation of a vehicle function, wherein the automation depends on the confidence value of the selected rule; wherein
   at least one rule of the rule-based data system is assigned a status value for a status, wherein the status value indicates how the confidence value of this rule is to be interpreted for this rule;
   wherein the status comprises at least one certain status value, wherein the assigned rule is used depending on the confidence value of the assigned rule; and wherein
   given the certain status value and if the confidence value falls within a third-lowest range, the control signal to automatically execute an operation is actively generated together with a notification and a user output that renders plausible the used rule for the user; and/or
   given the certain status value and if the confidence value falls within a fourth-lowest range, the control signal to automatically execute an operation is actively generated together with a notification, but without a user output that renders plausible the used rule for the user; and/or
   given the certain status value and if the confidence value falls within a fifth-lowest range, the control signal to automatically execute an operation is actively generated without a notification and without a user output that renders plausible the used rule for the user.

3. The method of claim 1, wherein threshold values are defined that indicate which automation is provided by the control signal at which confidence value.

4. The method of claim 1, wherein the automation is furthermore dependent on the determined context.

5. The method of claim 1, wherein
   a user output is generated based on the condition part of the selected rule and the determined context that renders plausible the use of the selected rule to the user; and
   the generated user output is output to the user.

6. The method of claim 2, wherein the user is identified, a degree of user experience is determined, and the automation furthermore depends on the determined degree of user experience.

7. The method of claim 2, wherein given the certain status value, a proposal to the user to execute an operation is actively generated together with a user output that renders plausible the used rule for the user if the confidence value falls to the lowest range.

8. The method of claim 2, wherein given the certain status value, a proposal to the user to execute an operation is actively generated together without a user output that renders plausible the used rule for the user if the confidence value falls within a second-lowest range.

9. The method of claim 1, wherein given the certain status value and if the confidence value falls within a third-lowest range, the control signal to automatically execute an operation is actively generated together with a notification and a user output that renders plausible the used rule for the user.

10. The method of claim 1, wherein given the certain status value and if the confidence value falls within a fourth-lowest range, the control signal to automatically execute an operation is actively generated together with a notification, but without a user output that renders plausible the used rule for the user.

11. The method of claim 1, wherein given the certain status value and if the confidence value falls within a fifth-lowest range, the control signal to automatically execute an operation is actively generated without a notification and without a user output that renders plausible the used rule for the user.

12. The method of claim 1, wherein the user is identified, a degree of user experience is determined, and the automation furthermore depends on the determined degree of user experience.

13. The method of claim 1, wherein
a hypothesis for a result of a rule of the data system is generated depending on the determined context and on the rule-based data system;
the generated hypothesis is output by a user interface;
a user input on the output of the hypothesis is determined;
using the determined user input, the output hypothesis is evaluated;
depending on the evaluation of the hypothesis, the rule-based data system is automatically adapted; and
depending on the determined context and on the adapted rule-based data system, the result of the rule of the data system is automatically generated.

14. A device for generating control signals to assist occupants in a vehicle, with:
a context data detection unit for determining the context of the vehicle;
a result unit that is designed to select a rule of a rule-based data system depending on the determined context, wherein the rule-based data system comprises a plurality of rules, wherein each rule has a condition part and a result part, wherein the condition part comprises conditions for the context of the vehicle, and to generate a result of the selected rule;
a confidence value detection unit that is designed to determine a confidence value assigned to the selected rule, wherein the confidence value indicates a probability with which a result of the rule corresponds to a preference of a user; and
an output unit for generating and outputting a control signal depending on the generated rule result, wherein the control signal provides an automation of a vehicle function, wherein automation depends on the confidence value of the selected rule; wherein
at least one rule of the rule-based data system is assigned a status value for a status; wherein
the status value indicates how the confidence value of this rule is to be interpreted for this rule; wherein
the status comprises at least one certain status value, wherein the assigned rule is used depending on the confidence value of the assigned rule; and wherein
given the certain status value, a proposal to the user to execute an operation is actively generated together with a user output that renders plausible the used rule for the user if the confidence value falls to the lowest range; and/or
given the certain status value, a proposal to the user to execute an operation is actively generated together without a user output that renders plausible the used rule for the user if the confidence value falls within a second-lowest range.

15. A device for generating control signals to assist occupants in a vehicle, with:
a context data detection unit for determining the context of the vehicle;
a result unit that is designed to select a rule of a rule-based data system depending on the determined context, wherein the rule-based data system comprises a plurality of rules, wherein each rule has a condition part and a result part, wherein the condition part comprises conditions for the context of the vehicle, and to generate a result of the selected rule;
a confidence value detection unit that is designed to determine a confidence value assigned to the selected rule, wherein the confidence value indicates a probability with which a result of the rule corresponds to a preference of a user; and
an output unit for generating and outputting a control signal depending on the generated rule result, wherein the control signal provides an automation of a vehicle function, wherein automation depends on the confidence value of the selected rule; wherein
at least one rule of the rule-based data system is assigned a status value for a status; wherein
the status value indicates how the confidence value of this rule is to be interpreted for this rule; wherein
the status comprises at least one certain status value, wherein the assigned rule is used depending on the confidence value of the assigned rule; and wherein
given the certain status value and if the confidence value falls within a third-lowest range, the control signal to automatically execute an operation is actively generated together with a notification and a user output that renders plausible the used rule for the user; and/or
given the certain status value and if the confidence value falls within a fourth-lowest range, the control signal to automatically execute an operation is actively generated together with a notification, but without a user output that renders plausible the used rule for the user; and/or
given the certain status value and if the confidence value falls within a fifth-lowest range, the control signal to automatically execute an operation is actively generated without a notification and without a user output that renders plausible the used rule for the user.

16. A non-transitory computer readable medium comprising contents that, when being executed by at least one computer, cause the computer to execute the method of claim 1.

17. A non-transitory computer readable medium comprising contents that, when being executed by at least one computer, cause the computer to execute the method of claim 2.

18. The method of claim 2, wherein threshold values are defined that indicate which automation is provided by the control signal at which confidence value.

19. The method of claim 2, wherein the automation is furthermore dependent on the determined context.

20. The method of claim 2, wherein
   a user output is generated based on the condition part of the selected rule and the determined context that renders plausible the use of the selected rule to the user; and
   the generated user output is output to the user.

* * * * *